United States Patent [19]

Loflin

[11] 4,137,872
[45] Feb. 6, 1979

[54] FUEL VAPORIZING DEVICE FOR INTERNAL COMBUSTION ENGINES

[76] Inventor: Max G. Loflin, Rte. 6, Box 333, Lexington, N.C. 27292

[21] Appl. No.: 661,149

[22] Filed: Feb. 25, 1976

[51] Int. Cl.² ............................................. F02M 21/06
[52] U.S. Cl. ............................ 123/34 A; 123/32 AH; 123/122 E; 123/122 F; 123/133
[58] Field of Search ............. 123/34 A, 122 E, 122 F, 123/122 G, 122 H, 32 AH, 133; 239/87, 136; 48/184

[56] References Cited

U.S. PATENT DOCUMENTS

| 2,130,666 | 9/1938 | Coffey | 123/122 E |
|---|---|---|---|
| 2,272,341 | 2/1942 | Holzapfel | 123/133 |
| 2,744,387 | 5/1956 | Reed et al. | 123/122 E |
| 2,745,727 | 5/1956 | Holzapfel | 48/184 |
| 3,762,378 | 10/1973 | Bitonti | 123/34 A |
| 3,765,382 | 10/1973 | Vandenberg | 123/34 A |
| 3,868,939 | 3/1975 | Friese | 123/34 A |
| 3,926,169 | 12/1975 | Leshner et al. | 123/32 SJ |
| 3,968,775 | 7/1976 | Harpman | 123/25 B |
| 3,999,525 | 12/1976 | Stumpp | 123/34 A |
| 4,023,538 | 5/1977 | Harpman et al. | 123/34 A |
| 4,050,419 | 9/1977 | Harpman et al. | 123/25 B |

FOREIGN PATENT DOCUMENTS

| 343489 | 11/1921 | Fed. Rep. of Germany | 123/122 E |
|---|---|---|---|
| 1476328 | 5/1969 | Fed. Rep. of Germany | 123/122 E |
| 212902 | 1/1925 | United Kingdom | 123/122 E |

*Primary Examiner*—Ronald H. Lazarus
*Assistant Examiner*—Jeffrey L. Yates
*Attorney, Agent, or Firm*—Mills & Coats

[57] ABSTRACT

The present invention relates to fuel vaporizing devices for vaporizing fuel prior to entering an internal combustion engine such that the vaporized fuel gives rise to an improved and more efficient combustion process within the engine, increasing gas mileage as well as providing for a more complete and efficient combustion process. More particularly, the fuel vaporizing device of the present invention includes a normally closed fuel vaporizing chamber adapted to receive fuel therein and wherein the chamber is heated so as to vaporize the fuel therein and to increase the pressure within the fuel vaporizing chamber. Also provided is a control valve forming a part of said fuel vaporizing device with the control valve being communicatively connected to said normally closed fuel vaporizing chamber and responsive to said pressure therein such that the valve opens once a certain or predetermined pressure level is present within said fuel vaporizing chamber. Upon reaching the predetermined pressure level, the valve opens allowing the fuel vapor within said fuel vaporizing chamber to pass therefrom, through said control valve, and into said engine.

7 Claims, 6 Drawing Figures

FUEL VAPORIZING DEVICE FOR INTERNAL COMBUSTION ENGINES

The present invention relates to fuel vaporizing devices, and more particularly to a fuel vaporizing device having a normally closed fuel vaporizing chamber adapted to be heated such that the fuel therein is vaporized and due to increase pressure therein an associated valve structure is opened, allowing the vaporized fuel to pass from said chamber, through said valve, into a combustion engine.

BACKGROUND OF THE INVENTION

Today, more than ever before, people are very energy conscious and are concerned greatly with energy conservation. Because of the significant energy consumed by automobiles, much emphasis has recently been placed on the development of more efficient and cleaner burning engines, particularly internal combustion engines. While some progress has been made in increasing fuel economy, much of the progress can be attributed solely to the reduction in automobile size.

Development work has been aimed directly at increasing the efficiency of internal combustion engines, and this development work has increased quite dramatically in the past few years because of the increase in energy conservation awareness by the public in general. At this point, it is difficult to properly evaluate the effectiveness of such development work and what progress has been made. It is clear that the ultimate in efficiency has not been reached in fuel consuming combustion engines, and as long as this is the case and energy is in short supply, there will be a need for further research and development in this area.

SUMMARY OF THE INVENTION

It is well appreciated that fuel in a vapor state is more volatile than when in a pure liquid state, and consequently, the combustion process of fuel in a vapor state is more complete and efficient than when in the pure liquid form. The present invention basically relates to a fuel vaporizing device for combustion engines. More specifically, the fuel vaporizing device of the present invention comprises a normally closed fuel vaporizing chamber that receives fuel therein. Heating means is provided for heating said normally closed vaporizing chamber, causing the fuel therein to generally reach a vapor state. Increases in the pressure in the fuel vaporizing chamber due to the vaporization of the fuel therein acts to open an associated normally closed valve once a certain pressure level is reached within the chamber, allowing the vaporized fuel to pass from said vaporizing chamber through said valve and into said engine. The vaporized fuel, being more volatile, increases the operating efficiency of the engine as the combustion process is more complete and a greater quantity of fuel is fully utilized during the combustion process.

It is, therefore, an object of the present invention to provide a fuel vaporizing device adapted to operate in conjunction with a combustion engine for increasing the operating efficiency of the engine and consequently, increasing the economy of the automobile or other power consuming device powered by said engine.

Still a further object of the present invention is to provide a very efficient fuel vaporizing device that acts to vaporize fuel in a normally closed fuel vaporizing chamber that is operatively associated with a normally closed valve that is designed to open in response to a predetermined pressure level in said chamber such that as the fuel within the chamber is vaporized the associated increase in pressure will cause the valve to open at a certain pressure level, allowing the vaporized fuel within the chamber to pass through said valve, and on into said engine.

Another object of the present invention is to provide a fuel vaporizing device of the type referred to above in which the fuel vaporizing device can be used in conjunction with a combustion engine in several different embodiments. In one embodiment, the fuel vaporizing device would be positioned so as to directly pass the vaporized fuel directly into the combustion chamber or piston cylinder of the engine while in another embodiment one or more of the fuel vaporizing devices could be incorporated into the head of the engine where the vaporized fuel would be introduced into the intake manifold of the engine.

A further object of the present invention resides in a fuel vaporizing device of the basic type described above wherein the fuel vaporizing device is of a simple and compact design that it is generally trouble free and will operate effectively and efficiently over a period of time.

A further object of the present invention as it pertains to a particular embodiment is to provide a fuel vaporizing device including a normally closed fuel vaporizing chamber for vaporizing fuel received therein by heating the same with an electric probe and/or positioning a portion of the exhaust manifold of an associated combustion engine in close proximity thereto such that heat transferred from the exhaust manifold is utilized in heating said fuel vaporizing chamber, and wherein fuel delivered to said normally closed fuel vaporizing chamber is delivered directly thereto in metered amounts by a fuel injection system wherein the injected fuel is vaporized in said normally closed fuel vaporizing chamber and expelled therefrom through an associated valve assembly that is actuated to an opened position and communicatively connected to said chamber by increases in pressure within said fuel vaporizing chamber due to the fuel vaporization process therein.

Other objects and advantages of the present invention will become apparent from a study of the following description and the accompanying drawings which are merely illustrative of the present invention.

DESCRIPTION OF THE PREFERRED EMBODIMENT

Figure 1:
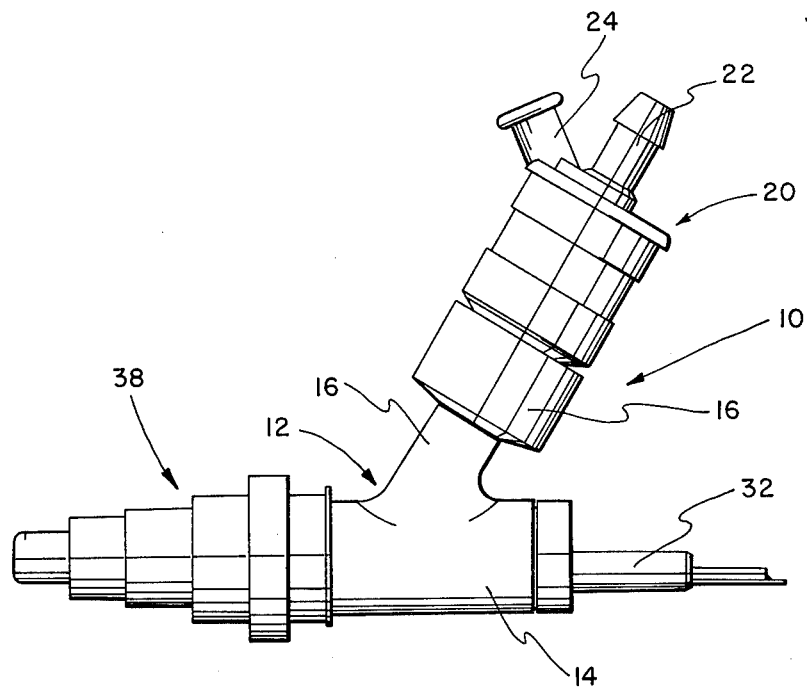
FIG. 1 is a side elevational view of the fuel vaporizing device of the present invention.
Figure 2:
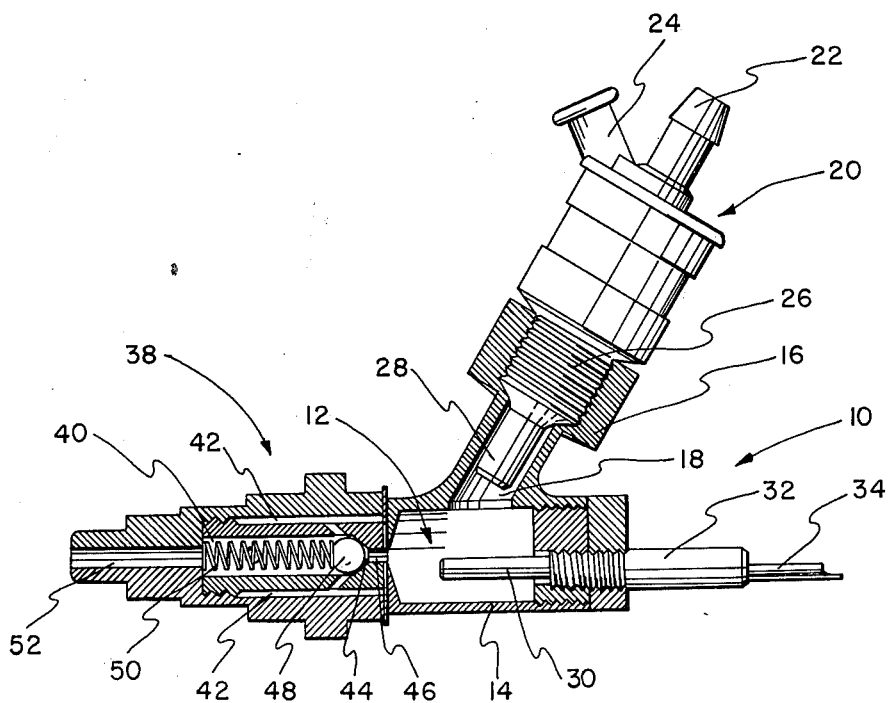
FIG. 2 is a side elevational sectional view of the same fuel vaporizing device shown in FIG. 1.
Figure 3:
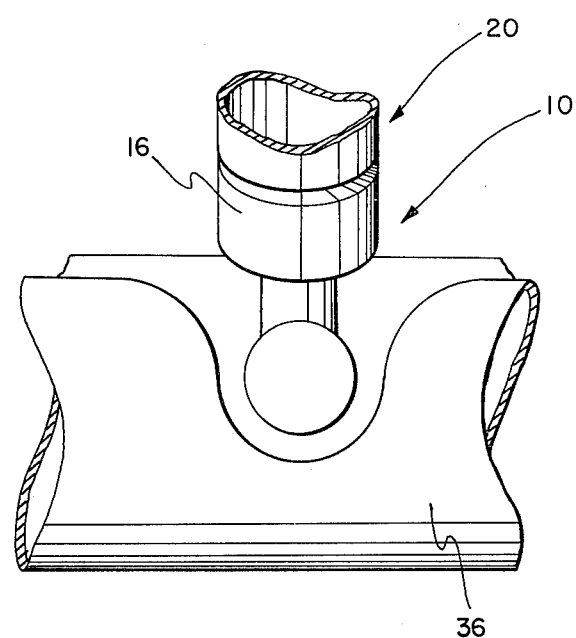
FIG. 3 is a fragmentary rear view of the fuel vaporizing device of the present invention, particularly illustrating its application with a combustion engine and the use of the engine's exhaust manifold to heat the fuel vaporizing chamber thereof.
Figure 4:
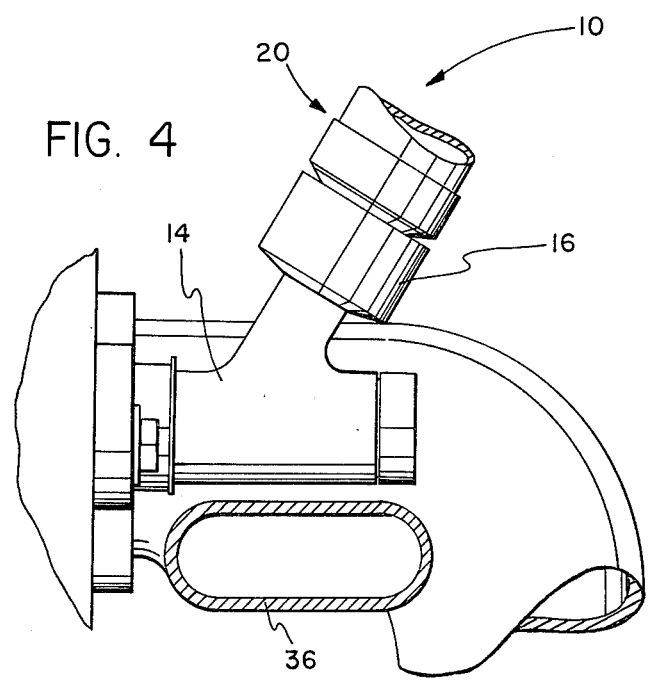
FIG. 4 is a side elevational view of the fuel vaporizing device of the present invention illustrating its application with a combustion engine and particularly showing the use of the engine's exhaust manifold that heats the fuel vaporizing chamber thereof.

With further reference to the drawings, particularly FIGS. 1 and 2, the fuel vaporizing device of the present invention is shown therein and indicated generally by the numeral 10. Viewing the fuel vaporizing 10 in greater detail, it is seen that the same comprises a normally closed fuel vaporizing chamber 12, that in the form shown in the preferred embodiment is in the form of an open area surrounded by generally cylindrical wall structures 14. As illustrated in the drawings, FIGS. 1 and 2, formed with chamber 12 is a neck structure 16 that branches outwardly therefrom and is threaded about an interior top portion. The area where the neck 16 joins the fuel vaporizing chamber 12 defines an inlet fuel opening 18 which allows fuel to pass into said fuel vaporizing chamber 12.

Secured within the neck 16 is a conventional electric magnetic fuel injection device, indicated generally by the numeral 20. Although details of the electric magnetic fuel injection device 20 is not dealt with herein in detail because such is conventionally used as a direct fuel injection means with internal combustion engines and those skilled in the art will appreciate and understand the function and principles of operation of said electric magnetic fuel injecting device 20. But for the sake of a more unified understanding of the present invention, a few brief Remarks may be in order relative to said electric magnetic fuel injection device 20.

In this regard the electric magnetic fuel injector 20 includes about the upper end thereof a fuel inlet fitting 22 adapted to receive a fuel supply line (not shown), and an electric connecting receptacle 24 that transmits electric current to and from the fuel injector 20 in order that the same may be electrically operated. Fuel injector 20 further includes a threaded exterior shaft portion 26 that is adapted to be thoroughly secured in the upper portion of the neck 16. Extending downwardly from the fuel injector 20 through the injector neck 16 is an injector end 28 which in accordance with the basic principles of operation of said electric magnetic fuel injector 20, injects a certain quality of fuel into the fuel vaporizing chamber 12 at certain time intervals in timed relationship to the operation of an associated engine.

In accordance with one of the principle objects of the present invention, that being to vaporize the fuel received within the vaporizing chamber 12, it will be appreciated that the fuel vaporizing device 10 of the present invention must have the capability to heat the fuel within the chamber 12 in order that the temperature of the fuel therein will be increased to the point where a substantial portion of the fuel therein may be vaporized prior to being directed into the associated engine. It is contemplated that one of the most efficient means for heating the fuel vaporizing chamber 12 is to position the chamber 12 in close proximity to an exhaust manifold 36 of the associated engine, or to actually route the exhaust manifold 36 or a portion thereof by the fuel vaporizing device 10 such that the manifold passes in close proximity to the vaporizing chamber 12 such that the heat therefrom is transferred by convection, radiation, or conduction to the vaporizing chamber 12.

In addition, as an optional feature, it in some cases would be desirable to provide a direct or positive heating means in the form of, as particularly illustrated in FIGS. 1 and 2, a heating element 30 of any conventional type wherein the heating element extends internally of the chamber 12 and in accordance with the preferred embodiment shown in the drawings, is supported about a shaft housing 32 that is threaded into an end portion closing one end of the chamber 12. Extending from the shaft housing 32 is appropriate electrical wiring 34 that leads to an energy source (not shown) that provides current to the heating element 30 for heating the fuel within the chamber 12. The use of this positive and direct heating means would especially be advantageous during the initial periods of engine operation when the exhaust manifold has not reached its normal operating temperature.

Continuing to refer to the preferred embodiment of the present invention, and particularly FIG. 2, there is provided communicatively associated with said normally closed fuel vaporizing chamber 12 a control valve indicated generally at the numeral 38. Control valve 38 is normally closed and consequently, the fuel vaporizing chamber 12 is likewise normally closed. But control valve 38 is of the type that is pressure responsive and accordingly is designed such that once a certain pressure level is present within the chamber 12 due to the pressure of the fuel as it has been vaporized, the control valve 38 will open and the vaporized fuel will pass therethrough directly into an associated combustion engine.

The particular type of control valve may be any suitable type of valve that is pressure responsive. For example, such control valve could be of the reed type, mushroom type, or various other conventional valve designs. In the embodiment shown, the control valve 38 is of the ball and spring type and viewing the valve shown therein in greater detail, it is seen that the same includes a main central passageway 40 that is communicatively connected to an intermediate passageway 46 that extends directly into the internal area of the normally closed fuel vaporizing chamber 12. Extending outwardly from the main central passage 40 is an exiting passage 52 from which the fuel vapor passes therefrom directly to the associated engine. Peripherally spaced with respect to the main central passageway 40 is a peripheral cavity 42 that generally encircles the main central passageway 40 and is opened thereto by an opening or series of openings. Defined in the general vicinity of where the intermediate passageway 46 communicates with the main central passage 40 is a valve seat 44 that is adapted to receive a ball 48 that is normally held in a closed position tightly adjacent the seat 44 by a coil spring 50 of certain design and characteristics that extends axially along said main central passageway 40 between the ball 48 and wherein the end of the spring opposite the ball rests against a flange formed within the valve 38 in the vicinity of where the main central passage 40 communicates with the exiting passage 52.

Figure 5:
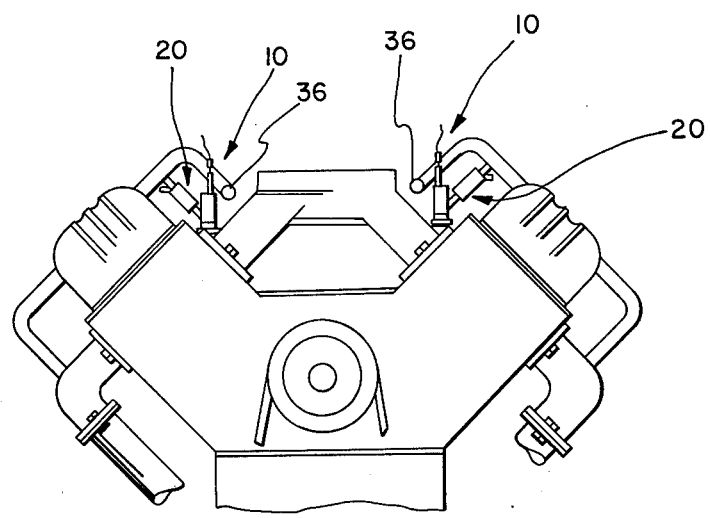
FIG. 5 is a front elevational view of an internal combustion engine showing the manner in which the fuel vaporizing device of the present invention may be utilized therewith.
Figure 6:
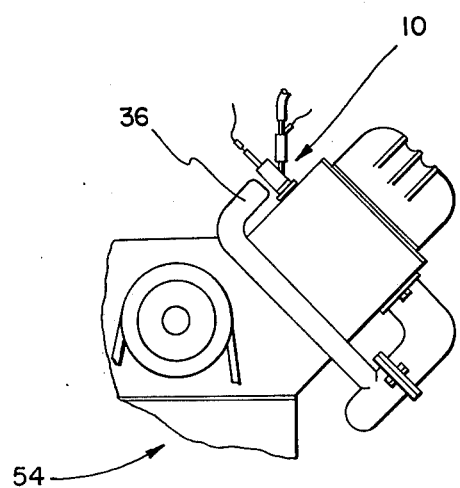
FIG. 6 is a front fragmentary elevational view of an internal combustion engine in which the fuel vaporizing device is disposed adjacent the engine cylinder head in an area where the vaporized fuel may be directly injected into the combustion chambers or piston cylinders.

Referring to FIGS. 5 and 6, the fuel vaporizing device 10 of the present invention is shown in two different locations with respect to a combustion engine, indicated generally by the numeral 54. In FIG. 5, a fuel vaporizing device 10 according to the present invention as discussed above, is placed on each side of the engine and is secured within the head area of the engine such that the exiting passage 52 is adapted to inject vaporized fuel into the intake manifold of the engine, where the fuel may pass directly into the combustion chambers in conventional manner. In the case of this application, the number of fuel vaporizing devices may vary, depending upon engine size, the efficiency and capacity of certain size fuel vaporizing devices 10, and other such variables.

Turning to FIG. 6, and the fragmentary view of engine 54, it is seen that the fuel vaporizing device 10 of the present invention is shown in a position such that the exiting end of the valve or the exiting passageway is positioned such that fuel is directly injected into the combustion cylinder of the engine in accordance with a certain timing scheme with respect to the stroke and cycling of the piston operating therein. In such an embodiment, it follows that the fuel vaporizing device 10 would be associated with each combustion cylinder, and it is understood that the fuel vaporizing device could be integrally constructed with the chamber and engine block assembly, or as indicated in FIGS. 1 and 2 could be a separate unit adapted to be secured into a position with respect to the combustion chamber such that fuel when vaporized thereby will flow directly through the control valve 38 into the engine's combustion chambers.

Therefore, one of the most basic principles of the present invention resides in the provision of the fuel vaporizing chamber 12 that is normally closed such that the efficiency of the fuel vaporizing process carried on therein can be maximized and particularly allow the fuel received therein to be vaporized as efficiently as possible with the natural heat of the associated engine 54. Also, it follows that as the fuel is vaporized, the pressure within the chamber 12 increases and because the control valve 38 is pressure responsive, the normally closed chamber will be maintained closed until a predetermined or certain pressure level is achieved within the chamber 12, at which time the control valve 38 opens and the vaporized fuel is allowed to pass from the chamber 12, through the control valve 38, and into the engine 54. From the foregoing, it is apparent that the fuel vaporizing device of the present invention is what may be referred to as a "pre-chamber" in that the normally closed fuel vaporizing chamber 12 of the present invention is disposed between the fuel supply and the intake manifold or the combustion cylinders or chambers of the engine 54. It is theorized that fuel may remain in the chamber 12 even after the control valve 38 has opened and vaporized fuel has passed from the chamber, through the control valve 38 and into the engine 54. In such a case, the remaining fuel may be finally vaporized during a subsequent operational period and when finally vaporized or substantially vaporized, the fuel will through the control valve 38 during an opened period thereof. The fuel vaporizing device of the present invention should eliminate or substantially eliminate problems such as vapor lock, explosion or preignition outside the confines of the combustion chambers, and prevent oxygen restriction via the combustion chamber that are common with any other type of fuel vaporizing devices.

The terms "upper", "lower", "forward", "rearward", etc., have been used herein merely for the convenience of the foregoing specification and in the appended claims to describe the fuel vaporizing device and its parts as oriented in the drawings. It is to be understood, however, that these terms are in no way limiting to the invention since the fuel vaporizing device may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A fuel vaporizing device adapted to operate in conjunction with an engine for vaporizing fuel and delivering the vaporized fuel to said engine, said fuel vaporizing device comprising: a normally closed fuel vaporizing chamber for receiving fuel therein; fuel injection means for delivering fuel to said vaporizing chamber; valve means associated with said normally closed fuel vaporizing chamber and operatively connected between said normally closed fuel vaporizing chamber and said engine for selectively controlling the flow of fuel from said vaporizing chamber to said engine, said valve means being normally closed and including control means responsive to the fuel vapor pressure within said normally closed chamber for opening said valve means in response to the presence of a certain fuel vapor pressure level within said vaporizing chamber; and heating means operatively associated with said normally closed fuel vaporizing chamber for heating and vaporizing fuel contained within said chamber to a pressure level where the pressure associated with the vaporized fuel exceeds a certain pressure level sufficient to cause said valve means to open whereupon when said valve means is opened the at least partially vaporized fuel may move from said chamber, through said valve means, and into said engine.

2. The fuel vaporizing device of claim 1 wherein said engine adapted to utilize said fuel vaporizing device includes an engine head and wherein said fuel vaporizing device is operatively mounted within said head of said engine wherein fuel vaporized thereby is delivered through said head into an engine intake manifold forming a part of said engine.

3. The fuel vaporizing device of claim 1 wherein said engine comprises a plurality of piston cylinders and wherein said fuel vaporizing device assumes a position adajcent each respective piston cylinder of said engine and wherein the valve means associated with each of said fuel vaporizing device is communicatively connected to each of said respective piston cylinders such that said fuel vapor from said chamber may enter respective piston cylinders via said valve means associated with each fuel vaporizing device.

4. A fuel vaporizing device of claim 1 wherein said heating means includes the provision of an exhaust manifold leading from said engine with a portion thereof being positioned in close proximity to said normally closed fuel vaporizing chamber wherein the heat associated with the portion of said exhaust manifold in close proximity to said fuel vaporizing chamber is transferred to said chamber and consequently said normally closed fuel vaporizing chamber is heated by a portion of said exhaust manifold.

5. The fuel vaporizing device of claim 4 wherein said heating means further includes an electric current actuated heating probe that extends into said normally closed fuel vaporizing chamber and is positioned therein for transferring heat therefrom into said normally closed fuel vaporizing chamber wherein said heating probe acts to heat and vaporize fuel received and held in said normally closed fuel vaporizing chamber.

6. The fuel vaporizing device of claim 1 wherein said valve means includes a passageway communicatively connected to said fuel vaporizing chamber and extending therefrom and operative to channel fuel vapor passing from said fuel vaporizing chamber into said engine, said valve means further including a valve seat formed about one end of said passageway adjacent said chamber and a ball normally seated within said valve seat and held within said valve seat by spring means extending in said passageway and engaged with said ball so as to normally press said ball into said valve seat and accordingly maintain said fuel vaporizing chamber in a normally closed state.

7. The fuel vaporizing device of claim 6 wherein said means for delivering fuel to said normally closed fuel vaporizing chamber comprises fuel injection means for metering fuel into said chamber as said engine is operated.

* * * * *